United States Patent
Kidwell

(10) Patent No.: US 8,108,907 B2
(45) Date of Patent: Jan. 31, 2012

(54) AUTHENTICATION OF USER DATABASE ACCESS

(75) Inventor: Peter P. Kidwell, Plantsville, CT (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 12/189,919

(22) Filed: Aug. 12, 2008

(65) Prior Publication Data

US 2010/0043054 A1  Feb. 18, 2010

(51) Int. Cl.
*H04L 9/32* (2006.01)
(52) U.S. Cl. ............ 726/2; 380/229; 380/232; 713/155; 713/168; 713/169; 713/170; 713/176
(58) Field of Classification Search ...... 726/2; 713/155, 713/168, 169, 170, 176; 380/229, 232
See application file for complete search history.

(56) References Cited

U.S. PATENT DOCUMENTS

| | | | | |
|---|---|---|---|---|
| 6,829,712 | B1 * | 12/2004 | Madoukh ........................ 726/2 |
| 7,234,157 | B2 | 6/2007 | Childs et al. |
| 7,437,457 | B1 * | 10/2008 | Eisendrath et al. .......... 709/225 |
| 2003/0074352 | A1 * | 4/2003 | Raboczi et al. .................. 707/4 |
| 2004/0015724 | A1 * | 1/2004 | Pham et al. .................... 713/201 |
| 2004/0123140 | A1 * | 6/2004 | Toomey ......................... 713/201 |
| 2005/0097322 | A1 * | 5/2005 | Gustave et al. ............... 713/168 |
| 2006/0129652 | A1 * | 6/2006 | Petrovskaya .................. 709/208 |
| 2006/0195816 | A1 | 8/2006 | Grandcolas et al. |
| 2007/0050620 | A1 | 3/2007 | Pham et al. |
| 2007/0214233 | A1 | 9/2007 | Cromer et al. |
| 2007/0300221 | A1 * | 12/2007 | Hartz et al. ........................ 718/1 |
| 2008/0082569 | A1 * | 4/2008 | Mansour et al. .............. 707/102 |
| 2008/0083026 | A1 * | 4/2008 | Sent ................................. 726/10 |
| 2009/0249215 | A1 * | 10/2009 | Paek .............................. 715/740 |

* cited by examiner

*Primary Examiner* — Saleh Najjar
*Assistant Examiner* — Joseph Pan
(74) *Attorney, Agent, or Firm* — Patrick J. Daugherty; Driggs, Hogg, Daugherty & Del Zoppo Co., LPA

(57) ABSTRACT

A database system and method combines the ability to concurrently utilize LDAP based authentication and operating system-based authentication. The database authentication tries both methods of authentication, both at the database layer and at the application layer. Security authentication of the user then occurs by whichever mechanism is first to return a successful result. Database administrators can, if desired, configure the system to prefer one mechanism (LDAP or operating system) over the other. With the present invention, a large end user population can be managed using standard LDAP tools, in an automated, administered, or "self-service" manner, as preferred. Thus, system accounts, such as the database owner, can remain within the operating system, easing installation and maintenance of the database product itself.

20 Claims, 3 Drawing Sheets

AUTHENTICATION OF USER DATABASE ACCESS

FIELD OF THE INVENTION

The present invention relates generally to the field of security and authentication of a proposed user seeking access to database files through a computer server.

BACKGROUND OF THE INVENTION

As computer networks continue to rapidly expand, there is a corresponding increase in the popularity of computer resources such as the internet and intranet. Database and server administrators must contend with issues of managing authentication of users who might have the right to access and log onto a database server. Traditionally, database server access has been managed using facilities, including user accounts and groups of proprietary and non-proprietary server operating systems (OS). These user accounts and groups are typically maintained outside the database by the server administrator. This is often a manual process, using operating system commands or specific interfaces. The process adds a great deal of overhead to the deployment and maintenance of a database system. Issues of password security and maintenance add even more overhead for the system administrator, particularly when dealing with confidential business information, and sensitive personnel records such as medical and salary histories.

The LDAP or Lightweight Directory Access protocol is an industry-standard that is used on a server operating system for maintaining operating system user accounts. Connectivity to a LDAP server is provided via the internet, the intranet or other computer network. Some computer programs for database management utilize various security mechanisms to authenticate proposed database users. These may include plug-in architectures for this purpose. As there are more automated methods for maintaining an LDAP directory than there are for maintaining operating system user accounts, these plug-ins can help to alleviate the task of maintaining large database user populations.

However, the use of an alternate mechanism, such as a proprietary LDAP plug-in, can lead to further problems for database administrators. In a proprietary database system, there are certain system accounts which may be used to install and "own" the database system. The installation and proper operation of the database requires that these accounts are integrated into the operating system and the underlying file system. However, in the implementation of certain proprietary security plug-in architectures, if an alternative plug-in is used, this plug-in completely replaces the more traditional authentication methods, for all user accounts associated with the database. This includes not only end users, but the system accounts as well. Thus, the system accounts which are required to be integrated with the operating system cannot be authenticated with the plug-in and, consequently, the database does not function.

A review of various database management systems shows a total lack of a solution that combines the ease of user maintenance provided by LDAP with the need for user accounts integrated into the underlying system. One such system has the concept of "Enterprise" users, who are identified and defined in an external directory, but must also be registered within the database itself by the database administrator, limiting the convenience of the LDAP functionality for user account maintenance. Another server system uses two modes of authentication: 1) database-based authentication, by which all user accounts are defined in the database itself; or 2) Windows® based authentication, in which user accounts are authenticated by the underlying Windows operating system, either as local logins or using an active directory. However, even with Windows-based authentication, all user accounts must be registered in the database by the database administrator as well.

SUMMARY OF INVENTION

To reap the benefits of LDAP-based account management for end users, while still allowing operating system authentication to be used for specific system accounts, a database system requires a mechanism that combines the benefits of both approaches outlined above. The present invention provides for a database manager system to concurrently use both LDAP-based authentication and operating-system-based authentication. The system tries both methods of authentication, and authenticates the user by whichever mechanism is first to return a successful result. Database managers can, if desired, configure the system to prefer one mechanism (LDAP or operating system) over the other. The process as used by a database management system utilizes a security plug-in at the application programming interface for providing security authentication of an intended user of a database. The process includes requesting authentication at a database layer using a lightweight directory access protocol (LDAP) program. Authentication is also requested from an operating system program. Access of the intended user to the database is granted based upon the first of said programs to provide a positive response to the request.

With the present invention, a large end user population can be managed using standard LDAP tools, in an automated, administered, or "self-service" manner, as preferred. Thus, system accounts, such as the database owner, could remain within the operating system, easing installation and maintenance of the database product itself.

In another aspect, methods are provided for deploying an application for conducting the authentication on behalf of the database manager or the user, for example, by a service provider who offers to implement, deploy, and/or perform functions for the database manager. Still further, an article of manufacture comprising a computer-usable medium having a computer readable program in said medium may be provided. Such program code comprises instructions which, when executed on a computer system, cause the computer system to perform one or more method and/or process elements for the authentication, for example, as described above. Moreover, systems, articles and programmable devices configured for performing one or more method and/or process elements of the current invention, as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
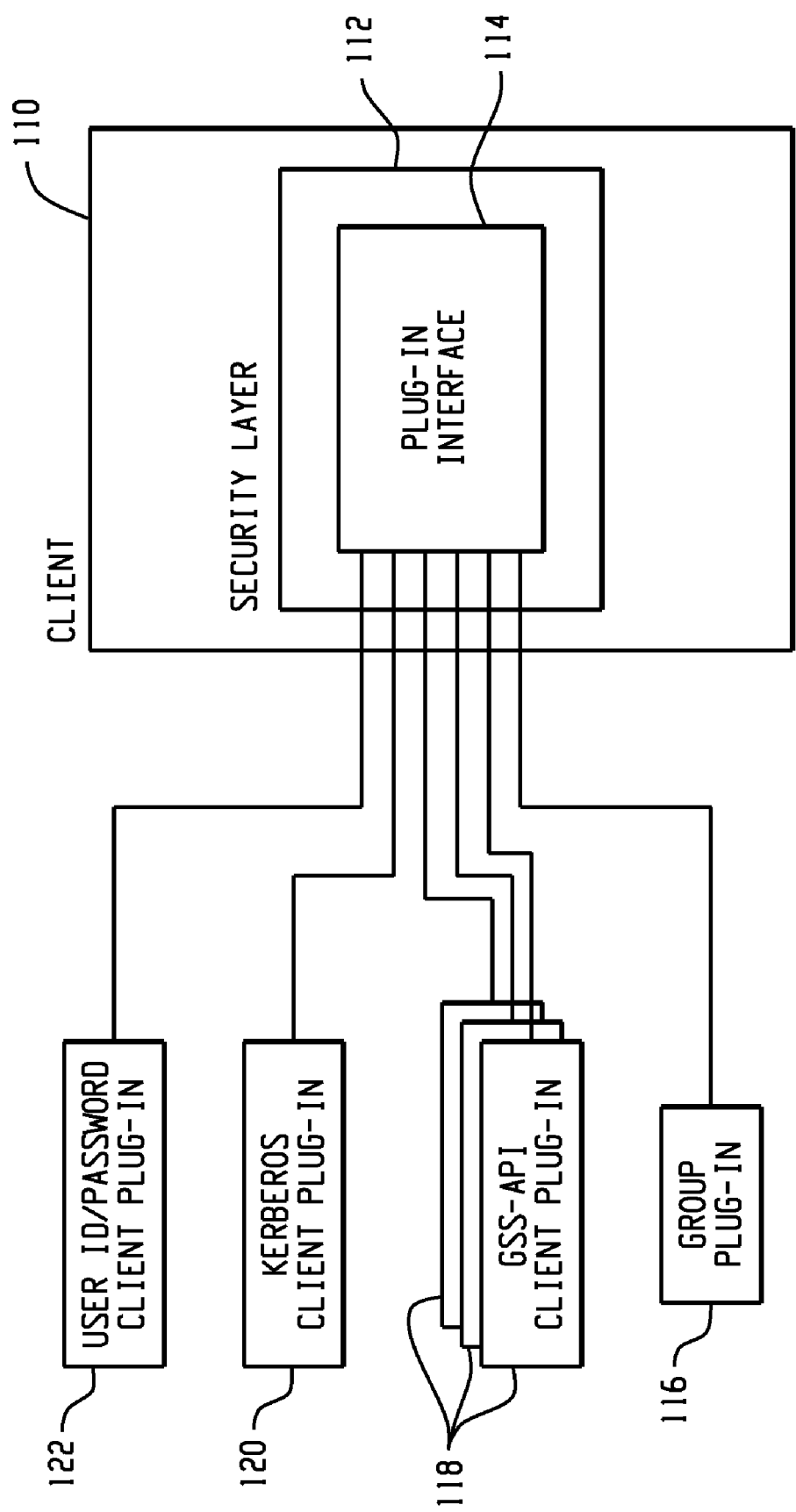
FIG. 1 shows a basic security plug-in feature as deployed in connection with the present invention.

The drawings are not intended to be drawn to scale. Instead, the drawings are merely a schematic representation, not intended to portray specific parameters of the invention.

They are intended to depict only typical embodiments of the invention and, therefore, should not be considered as limiting the scope of the invention.

DETAILED DESCRIPTION OF THE INVENTION

The present invention comprises an improvement in the utilization of computer programs for database management by a database manager system. For purposes of the present invention, a database manager system (DBMS) is a system which stores and organizes information for later retrieval, and allows an authority to read and/or update the stored data to be granted to individual users or groups of users.

In one embodiment, the invention is implemented as a security plug-in, based on a directory access protocol authentication plug-in source code that responds to a security Application Program Interface (API). One such protocol useful in the present invention is the LDAP or Lightweight Directory Access protocol. A security plug-in is a dynamically loadable library that provides one or more of the following functionalities. 1) A group retrieval plug-in retrieves group membership information for a given user. 2) A client authentication plug-in manages authentication on a particular client. 3) A server authentication plug-in manages authentication on a server.

Two mechanisms for plug-in authentication are supported in the present invention. One utilizes a user identifier and password in addition to a code which determines where authentication will occur (group, client or server). The other uses a GSS-API, or Generic Security Service Application Program Interface. These two plug-ins can be used independently or in conjunction with one or more of the others. However, when using GSS-API authentication, both a client plug-in and a server plug-in are required. Authentication is also possible for a Kerberos Interface. This is a protocol which allows users communicating over a non-secure network to verify their identity to a server in a secure manner. It is most often used by large, commonly available operating systems, such as Microsoft and Apple's MAC OS.

There are several well known APIs that are listed on the internet under 'API'. An API is a source code interface that an operating system, library or service provides to support requests made by computer programs For each API routine, the plug-in code may branch to an LDAP function and/or an operating system function, based on the configuration parameters and the results of previous attempts. A systems administrator can configure the plug-in in one of several ways, such as:

1. Authenticate with the operating system BEFORE authenticating with LDAP (prefer operating system accounts);
2. Authenticate with the operating system AFTER authenticating with LDAP (prefer LDAP accounts), or
3. Authenticate with the operating system NEVER (only use LDAP, this reverts to the behavior of a sample plug-in).

Turning now to the drawings, FIG. 1 represents plug-in features useful in connection with a security layer of a database client's computer system. The system 110 includes a security layer 112 containing a plug-in interface 114. The interface is equipped to receive multiple plug-ins, several of which are shown. These include a group plug-in 116, multiple GSS-API client plug-ins 118, a Kerberos client plug-in 120, and a user ID/password client plug-in 122. Only one group plug-in is typically used. A server can generally provide more than one GSS-API client plug-ins as shown in 118. One user ID/password client plug-in 122 is shown.

Figure 2:
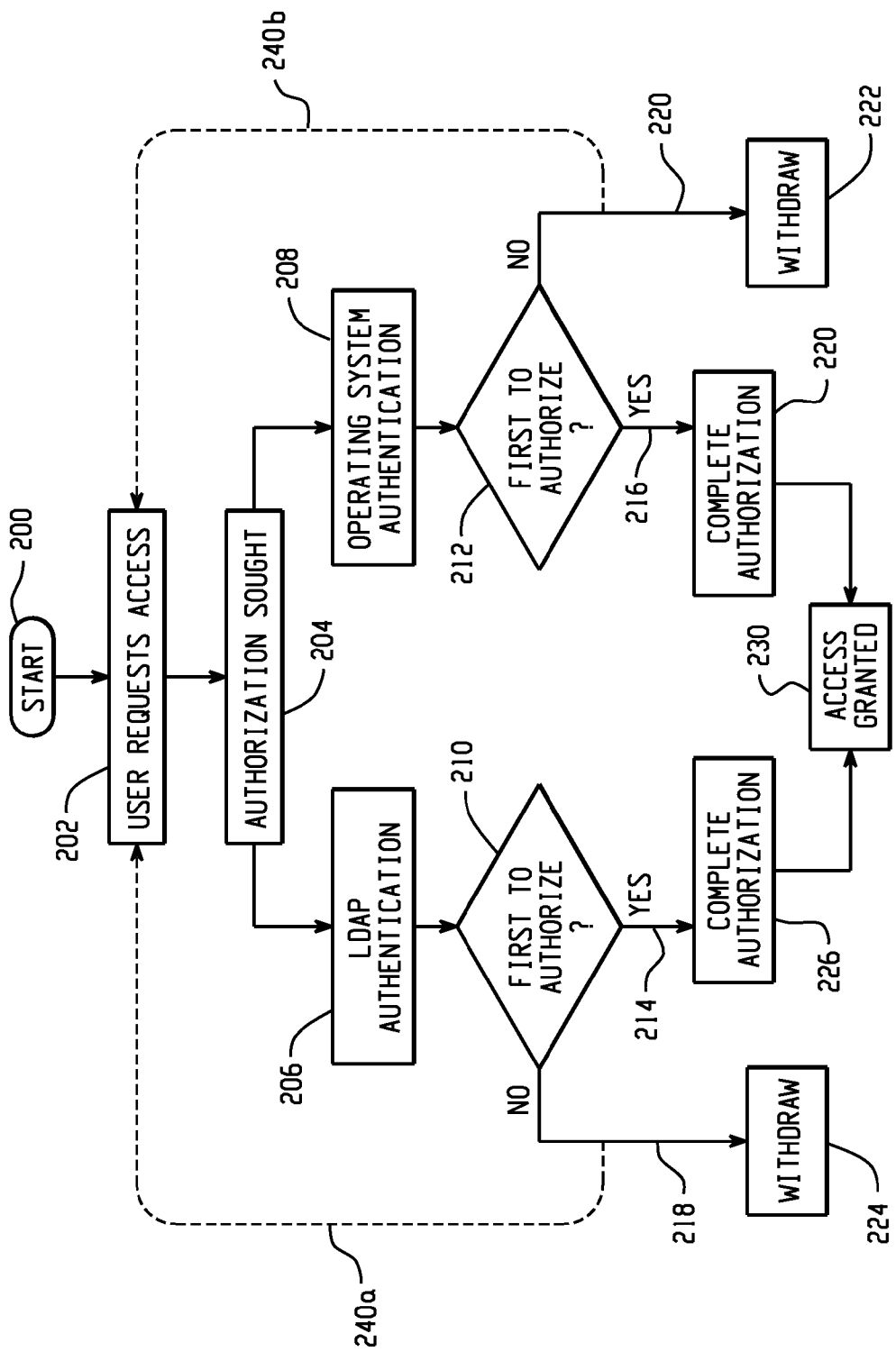
FIG. 2 is a simplified flow diagram of the present invention.

The basic process flow is shown in FIG. 2, as follows. A proposed database user at 200 initiates a request 202 for access to the database that is transmitted at 204 to an administrator of an operating system. The administrator attempts to authenticate by seeking confirmation at 206 through LDAP and at 208 through the server's operating system itself. If the LDAP responds at 210 before an operating system response, a 'yes' message at 214 triggers the completion of authorization at 226. Access is then granted through the LDAP at 230, and server-based authorization is denied at 220, and the request is withdrawn at 222.

If, on the other hand, the operating system responds at 212 to the request before the LDAP responds, a 'yes' message at 216 permits the authorization to be complete at 220, whereupon access is granted at 230. Then the user is authenticated within the operating system itself and the authentication request from the LDAP is withdrawn at 224.

If neither the operating system nor the LDAP authenticates the identity of the requestor, error signals 240a, 240b are returned to the user at 202, and entry to the database is denied.

The flow is also shown in pseudocode as follows:

```
Respond to database request:

Read plug-in configuration variable "CHECK_LOCAL"
    If CHECK_LOCAL is "BEFORE" then:
        Call Operating System Function
            If result is success, return to
    End If
        Call LDAP Function
        If result is success, return to database
        If CHECK_LOCAL is "AFTER" then:
            Call Operating System Function
                If result is success, return to database
    End If
        If no successful results, raise error
```

The LDAP functions can be implemented by reusing the code from a supplied plug-in. The operating system functions can be implemented using AIX operating system procedure calls.

Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium including, but not limited to, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. Thus, embodiments of the present invention comprise methods, apparatus (e.g. systems, devices, etc.) and computer program products. For example, it will be understood that each block of the flowchart illustrations and/or block diagrams of FIGS. 1 and 2 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps such as those shown in FIG. 2 to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
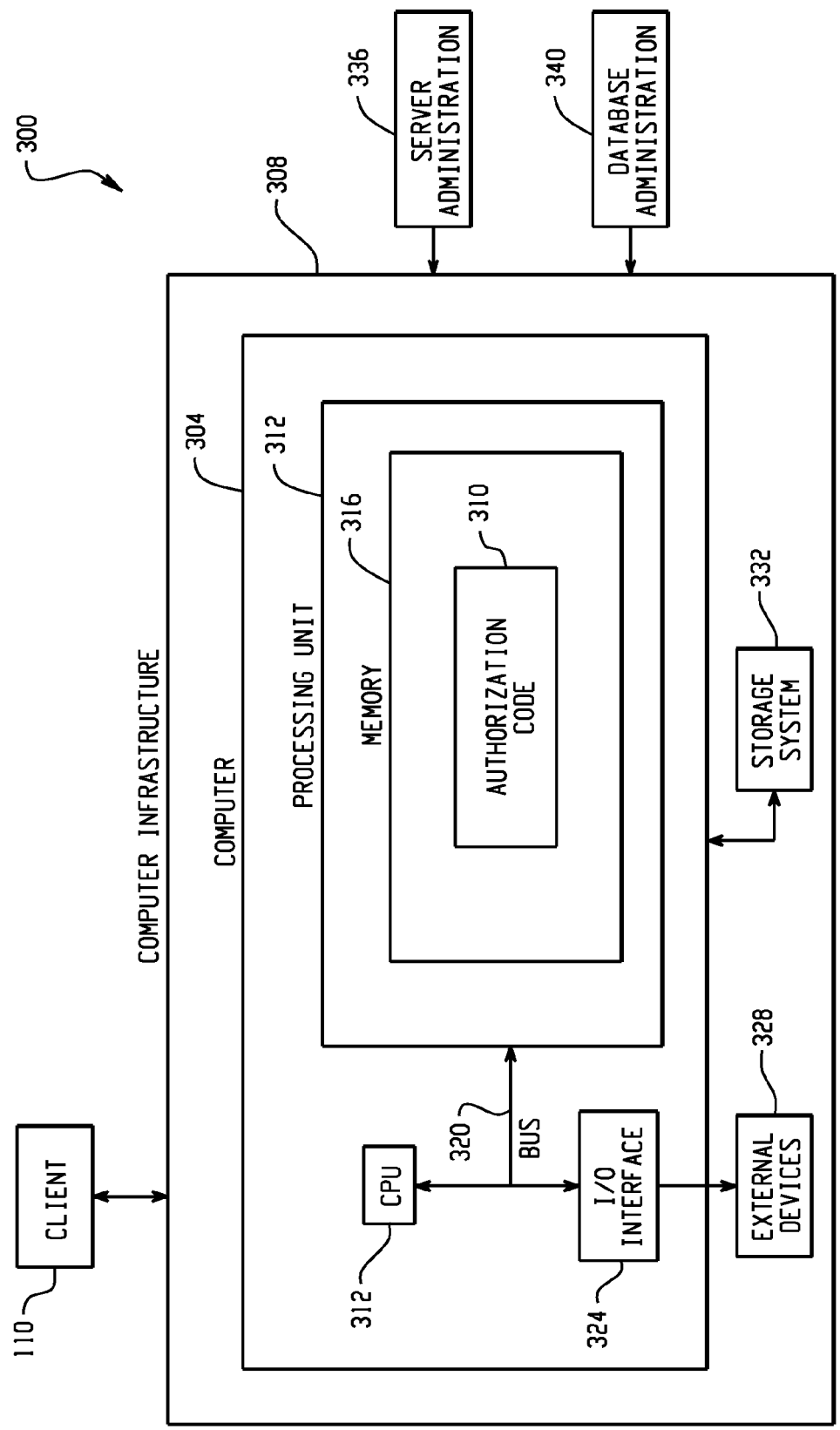
FIG. 3 is an exemplary computerized system and method for implementing the present invention.

Referring now to FIG. 3, the block diagram illustrates the architecture and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or successively, or may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More specifically, FIG. 3 shows an exemplary implementation of a computer system 300 which includes a computer 304 deployed within a computer infrastructure 308, for example, a programmable device such as a personal digital assistant (PDA) or cellular phone. This is intended to demonstrate, among other things, that the present invention could be implemented within a network environment (e.g., the Internet, a wide area network (WAN), a local area network (LAN), a virtual private network (VPN), etc.) in communication with one or more additional computers, or on a stand-alone computer infrastructure 308. In the case of the former, communication throughout a network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Shown communicating with the infrastructure 308 are a client 110, a server administrator 336 and a database administrator 340. It should be understood that these three elements can likewise communicate with one another outside of the computer infrastructure 308 as well.

As shown, the computer 304 includes a central processing unit (CPU) 312, a memory 316, a bus 320, and input/output (I/O) interfaces 324. Further, the computer 304 is shown in communication with external I/O devices/resources 328 and storage system 332. In general, the processing unit 312 executes computer program code, such as the authorization code 310 to implement various components of the process and system for implementing the authorization steps as described in FIG. 2. The code for this implementation may be stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interface 324. The bus 320 provides a communication link between each of the components in computer 304. The external devices 328 can comprise any devices (e.g., keyboard, pointing device, display, etc.) that enable a user to interact with computer 304 and/or any devices (e.g., network card, modem, etc.) that enable a computer to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer 304 is only representative of various possible computer systems that can include numerous combinations of hardware.

To this extent, in other embodiments, the computer 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or may be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interface 324 can comprise any system for exchanging information with one or more of the external devices 328. Still further, it is understood that one or more additional components (e.g., system software, math co-processing unit, etc.) not shown in FIG. 3 can be included in computer 304. However, if computer 304 comprises a handheld device or the like, it is understood that one or more of the external devices 328 (e.g., a display) and/or the storage systems 332 could be contained within computer 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer 304.

Still yet, computer infrastructure 308 is intended to demonstrate that some or all of the components of implementation could be deployed, managed, serviced, etc. by a service provider who offers to implement, deploy, and/or perform the functions of the present invention for others, for example, by licensing methods and browser or application server technology according to the present invention to an internet service provider (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing security authentication of an intended user of a database, the method comprising:
    in response to a request from a user for access to a database of a server, concurrently requesting via an administrator of an operating system authentication both:
        from a directory access protocol database layer security plug-in of the server using input of a user identifier, a password and a code that identifies the security plug-in, through a directory access protocol application program interface; and
        from an operating system of the server through an operating system procedure call that does not require input through the directory access protocol application program interface of the user identifier, the password and the code that identifies the security plug-in;
    granting access to the user to the database based upon a first one of the security directory access protocol security plug-in and the operating system providing a positive response to the request authenticating the user, and withdrawing the request from the other of the directory access protocol security plug-in and the operating system; and
    if neither of the directory access protocol security plug-in and the operating system provide a positive response to the concurrent requests authenticating the identity of the user, denying entry to the database by the user and returning an error signal to the user.

2. The method according to claim 1 wherein the directory access protocol security plug-in is a lightweight directory access protocol (LDAP) security plug-in.

3. The method according to claim 2 wherein concurrently requesting authentication further comprises preferring the server operating system by requesting authentication from the server operating system prior to requesting authentication from the LDAP security plug-in.

4. The method according to claim 2 wherein concurrently requesting authentication further comprises preferring the LDAP security plug-in by requesting authentication from the LDAP security plug-in prior to requesting authentication from the server operating system.

5. The method according to claim 2 wherein the server directory access protocol database layer security plug-in is one of a plurality of plug-ins of the server, the plurality of server plug-ins comprising two or more of a group retrieval plug-in that retrieves group membership information for a user, a client authentication plug-in that manages authentication on a client, and a server authentication plug-in that manages authentication on the server; and wherein the code that identifies the security plug-in identifies one of the group retrieval plug-in, the client authentication plug-in and the server authentication plug-in.

6. A system, comprising:

a processing unit, a computer readable memory and a computer-readable tangible storage device:

wherein the processing unit, when executing program instructions stored on the computer-readable tangible storage device via the computer readable memory, in response to a request from a user for access to a database of a server:

concurrently requests via an administrator of an operating system authentication both:

from a directory access protocol database layer security plug-in of the server using input of a user identifier, a password and a code that identifies the security plug-in, through a directory access protocol application program interface; and from an operating system of the server through an operating system procedure call that does not require input through the directory access protocol application program interface of the user identifier, the password and the code that identifies the security plug-in;

grants access to the user to the database based upon a first one of the server security directory access protocol security plug-in and the server operating system to provide a positive response to the request authenticating an identity of the user for granting access to the database, and withdraws the request from the other of the server directory access protocol security plug-in and the server operating system; and if neither of the server directory access protocol security plug-in and the server operating system provide a positive response to the request authenticating the identity of the user, denies entry to the database by the user and returns an error signal to the user.

7. The system according to claim 6 wherein the directory access protocol security plug-in is a lightweight directory access protocol (LDAP) security plug-in.

8. The system according to claim 7, wherein the processing unit, when executing the program instructions stored on the computer-readable tangible storage device via the computer readable memory, concurrently requests authentication by preferring the server operating system by requesting authentication from the server operating system program before requesting authentication from the LDAP security plug-in.

9. The system according to claim 7, wherein the processing unit, when executing the program instructions stored on the computer-readable tangible storage device via the computer readable memory, concurrently requests authentication by preferring the LDAP security plug-in by requesting authentication from the LDAP security plug-in prior to requesting authentication from the server operating system.

10. The system method according to claim 7 wherein the server directory access protocol database layer security plug-in is one of a plurality of plug-ins of the server, the plurality of server plug-ins comprising two or more of a group retrieval plug-in that retrieves group membership information for a user, a client authentication plug-in that manages authentication on a client, and a server authentication plug-in that manages authentication on the server; and wherein the code that identifies the security plug-in identifies one of the group retrieval plug-in, the client authentication plug-in and the server authentication plug-in.

11. A method provided by a service provider for conducting security authentication of an intended user of a database, the method comprising the steps of:

providing a processing unit within a computer system that, when executing program instructions, in response to a request from a user for access to a database of a server:

concurrently requests via an administrator of an operating system authentication both:

from a directory access protocol database layer security plug-in of the server using input of a user identifier, a password and a code that identifies the security plug-in, through a directory access protocol application interface; and from an operating system of the server through an operating system procedure call that does not require input through the directory access protocol application program interface of the user identifier, the password and the code that identifies the security plug-in;

grants access to the user to the database based upon a first one of the server security directory access protocol security plug-in and the server operating system to provide a positive response to the request authenticating an identity of the user for granting access to the database, and withdraws the request from the other of the server directory access protocol security plug-in and the server operating system; and if neither of the server directory access protocol security plug-in and the server operating system provide a positive response to the request authenticating the identity of the user, denies entry to the database by the user and returns an error signal to the user.

12. The method according to claim 11 wherein the directory access protocol security plug-in is a lightweight directory access protocol (LDAP) security plug-in.

13. The method according to claim 12 wherein the processing unit, when executing the program instructions, concurrently requests authentication by preferring the server operating system by requesting authentication from the server operating system program before requesting authentication from the LDAP security plug-in.

14. The method according to claim 12 wherein the processing unit, when executing the program instructions, concurrently requests authentication by preferring the LDAP security plug-in by requesting authentication from the LDAP security plug-in prior to requesting authentication from the server operating system.

15. The method according to claim 12 wherein the server directory access protocol database layer security plug-in is one of a plurality of plug-ins of the server, the plurality of server plug-ins comprising two or more of a group retrieval plug-in that retrieves group membership information for a user, a client authentication plug-in that manages authentication on a client, and a server authentication plug-in that manages authentication on the server; and wherein the code that identifies the security plug-in identifies one of the group retrieval plug-in, the client authentication plug-in and the server authentication plug-in.

16. An article of manufacture, comprising:

a computer-readable tangible storage device having computer readable program code embodied therewith, the computer readable program code comprising instructions which, when executed on a computer system, cause the computer system to:

concurrently request via an administrator of an operating system authentication both:
: from a directory access protocol database layer security plug-in of the server using input of a user identifier, a password and a code that identifies the security plug-in, through a directory access protocol, application program interface; and
: from an operating system of the server through an operating system procedure call that does not require input through the directory access protocol application program interface of the user identifier, the password and the code that identifies the security plug-in;

grant access to the user to the database based upon a first one of the server security directory access protocol security plug-in and the server operating system to provide a positive response to the request authenticating an identity of the user for granting access to the database, and withdraw the request from the other of the server directory access protocol security plug-in and the server operating system; and if neither of the server directory access protocol security plug-in and the server operating system provide a positive response to the request authenticating the identity of the user, deny entry to the database by the user and return an error signal to the user.

17. The article according to claim 16 wherein the directory access protocol security plug-in is a lightweight directory access protocol (LDAP) security plug-in.

18. The article according to claim 17 wherein the instructions, when executed on the computer system, further cause the computer system to concurrently request authentication by preferring the server operating system by requesting authentication from the server operating system program before requesting authentication from the LDAP security plug-in.

19. The article according to claim 17 wherein the instructions, when executed on the computer system, further cause the computer system to concurrently request authentication by preferring the LDAP security plug-in by requesting authentication from the LDAP security plug-in prior to requesting authentication from the server operating system.

20. The article according to claim 17 wherein the server directory access protocol database layer security plug-in is one of a plurality of plug-ins of the server, the plurality of server plug-ins comprising two or more of a group retrieval plug-in that retrieves group membership information for a user, a client authentication plug-in that manages authentication on a client, and a server authentication plug-in that manages authentication on the server; and
: wherein the code that identifies the security plug-in identifies one of the group retrieval plug-in, the client authentication plug-in and the server authentication plug-in.

* * * * *